(12) United States Patent
Bode et al.

(10) Patent No.: US 6,741,903 B1
(45) Date of Patent: May 25, 2004

(54) METHOD FOR RELATING PHOTOLITHOGRAPHY OVERLAY TARGET DAMAGE AND CHEMICAL MECHANICAL PLANARIZATION (CMP) FAULT DETECTION TO CMP TOOL INDENTIFICATION

(75) Inventors: Christopher Allen Bode, Austin, TX (US); Anthony J. Toprac, Austin, TX (US)

(73) Assignee: Adavanced Micro Devices, Inc., Austin, TX (US)

( * ) Notice: Subject to any disclaimer, the term of this patent is extended or adjusted under 35 U.S.C. 154(b) by 791 days.

(21) Appl. No.: 09/585,199

(22) Filed: Jun. 1, 2000

(51) Int. Cl.⁷ .......................... G06F 19/00; H01L 21/66
(52) U.S. Cl. .......................... 700/121; 700/28; 438/14
(58) Field of Search .................... 700/28–31, 117–121; 438/14–18; 451/5–6, 8

(56) References Cited

U.S. PATENT DOCUMENTS

| | | | |
|---|---|---|---|
| 5,933,744 A | | 8/1999 | Chen et al. ............... 438/401 |
| 6,100,985 A | | 8/2000 | Scheiner et al. ............ 356/381 |
| 6,230,069 B1 | | 5/2001 | Campbell et al. .......... 700/121 |
| 6,245,581 B1 | * | 6/2001 | Bonser et al. ................. 438/8 |
| 6,292,265 B1 | * | 9/2001 | Finarov et al. ............. 356/630 |
| 6,368,879 B1 | * | 4/2002 | Toprac .......................... 438/5 |
| 6,392,229 B1 | * | 5/2002 | Dana et al. ................. 250/306 |
| 6,425,801 B1 | | 7/2002 | Takeishi et al. .............. 451/5 |
| 6,465,263 B1 | * | 10/2002 | Coss et al. .................... 438/14 |
| 6,484,064 B1 | * | 11/2002 | Campbell .................... 700/100 |
| 6,532,428 B1 | * | 3/2003 | Toprac ........................ 702/97 |

FOREIGN PATENT DOCUMENTS

| | | | | |
|---|---|---|---|---|
| EP | 0987744 A1 | 3/2000 | ....... | H01L/21/3105 |
| WO | WO 00/54325 | 9/2000 | ........... | H01L/21/66 |

* cited by examiner

*Primary Examiner*—Maria N. Von Buhr
(74) *Attorney, Agent, or Firm*—Williams, Morgan & Amerson

(57) ABSTRACT

A method is provided, the method comprising processing a workpiece, having a photolithography overlay target structure disposed thereon, using a chemical-mechanical planarization (CMP) tool and measuring a photolithography overlay parameter using the photolithography overlay target structure. The method also comprises forming an output signal corresponding to the photolithography overlay parameter measured and to the chemical-mechanical planarization (CMP) tool used and using the output signal to improve at least one of accuracy in photolithography overlay metrology and fault detection in chemical-mechanical planarization (CMP).

36 Claims, 12 Drawing Sheets

METHOD FOR RELATING PHOTOLITHOGRAPHY OVERLAY TARGET DAMAGE AND CHEMICAL MECHANICAL PLANARIZATION (CMP) FAULT DETECTION TO CMP TOOL INDENTIFICATION

BACKGROUND OF THE INVENTION

1. Field of the Invention

This invention relates generally to semiconductor fabrication technology, and, more particularly, to a method for semiconductor fabrication supervision and optimization.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing defects in the manufacture of the components of a typical transistor also lowers the overall cost per transistor as well as the cost of integrated circuit devices incorporating such transistors.

The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an improved monitoring and diagnostics system for such tools would provide a means of monitoring this variability, as well as providing means for optimizing control of critical parameters.

Among the parameters it would be useful to monitor and control are photolithography overlay measurements. Measurements of photolithography overlay are facilitated by using overlay target structures, as shown in FIGS. 3–8, for example. These photolithography overlay target structures are formed on the surface of a workpiece (such as a semiconducting wafer) so that successive portions of the overlay target structures are formed as each successive process layer is formed and patterned, using a photolithography masking step, above the surface of the workpiece. The positional relationship of the photolithography pattern of one process layer to the photolithography pattern of another process layer determines the quality of the photolithography pattern alignment. Accurate measurement of this photolithography overlay is important in semiconductor manufacturing.

However, accurate measurement of this photolithography overlay using photolithography overlay target structures can typically be inhibited by damage to the photolithography overlay target structures induced by chemical-mechanical planarization (CMP). Chemical-mechanical planarization (CMP) is a process designed to remove and/or eliminate unwanted surface or "topographic" features of a process layer. Chemical-mechanical planarization (CMP) typically involves physically polishing the surface or "topography" of a process layer in the presence of a chemically reactive slurry to remove and/or eliminate the unwanted surface or topographic features of the process layer. Needless to say, chemical-mechanical planarization (CMP) typically disturbs and/or damages those portions of the photolithography overlay target structures that may be present in the process layer being subjected to the chemical-mechanical planarization (CMP). This disturbance and/or damage to those portions of the photolithography overlay target structures typically inhibits the accurate measurement of the photolithography overlay taken using the disturbed and/or damaged photolithography overlay target structures.

The present invention is directed to overcoming, or at least reducing the effects of, one or more of the problems set forth above.

SUMMARY OF THE INVENTION

In one aspect of the present invention, a method is provided, the method comprising processing a workpiece, having a photolithography overlay target structure disposed thereon, using a chemical-mechanical planarization (CMP) tool and measuring a photolithography overlay parameter using the photolithography overlay target structure. The method also comprises forming an output signal corresponding to the photolithography overlay parameter measured and to the chemical-mechanical planarization (CMP) tool used and using the output signal to improve at least one of accuracy in photolithography overlay metrology and fault detection in chemical-mechanical planarization (CMP).

In another aspect of the present invention, a computer-readable, program storage device is provided, encoded with instructions that, when executed by a computer, perform a method, the method comprising processing a workpiece, having a photolithography overlay target structure disposed thereon, using a chemical-mechanical planarization (CMP) tool and measuring a photolithography overlay parameter using the photolithography overlay target structure. The method also comprises forming an output signal corresponding to the photolithography overlay parameter measured and to the chemical-mechanical planarization (CMP) tool used and using the output signal to improve at least one of accuracy in photolithography overlay metrology and fault detection in chemical-mechanical planarization (CMP).

In yet another aspect of the present invention, a computer programmed to perform a method is provided, the method comprising processing a workpiece, having a photolithography overlay target structure disposed thereon, using a chemical-mechanical planarization (CMP) tool and measuring a photolithography overlay parameter using the photolithography overlay target structure. The method also comprises forming an output signal corresponding to the photolithography overlay parameter measured and to the chemical-mechanical planarization (CMP) tool used and using the output signal to improve at least one of accuracy in photolithography overlay metrology and fault detection in chemical-mechanical planarization (CMP).

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIGS. 1–2 and 9–13 schematically illustrate a flow chart for various embodiments of a method for manufacturing according to the present invention;

FIGS. 3–8 schematically illustrate overlay errors in photolithography;

FIG. 14 schematically illustrates a method for fabricating a semiconductor device practiced in accordance with the present invention;

FIG. 15 schematically illustrates workpieces being processed using a processing tool, using a plurality of control input signals, in accordance with the present invention;

FIGS. 16–17 schematically illustrate one particular embodiment of the process and tool in FIG. 15; and FIG. 18 schematically illustrates one particular embodiment of the method of FIG. 14 as may be practiced with the process and tool of FIGS. 16–17.

Figure 1:
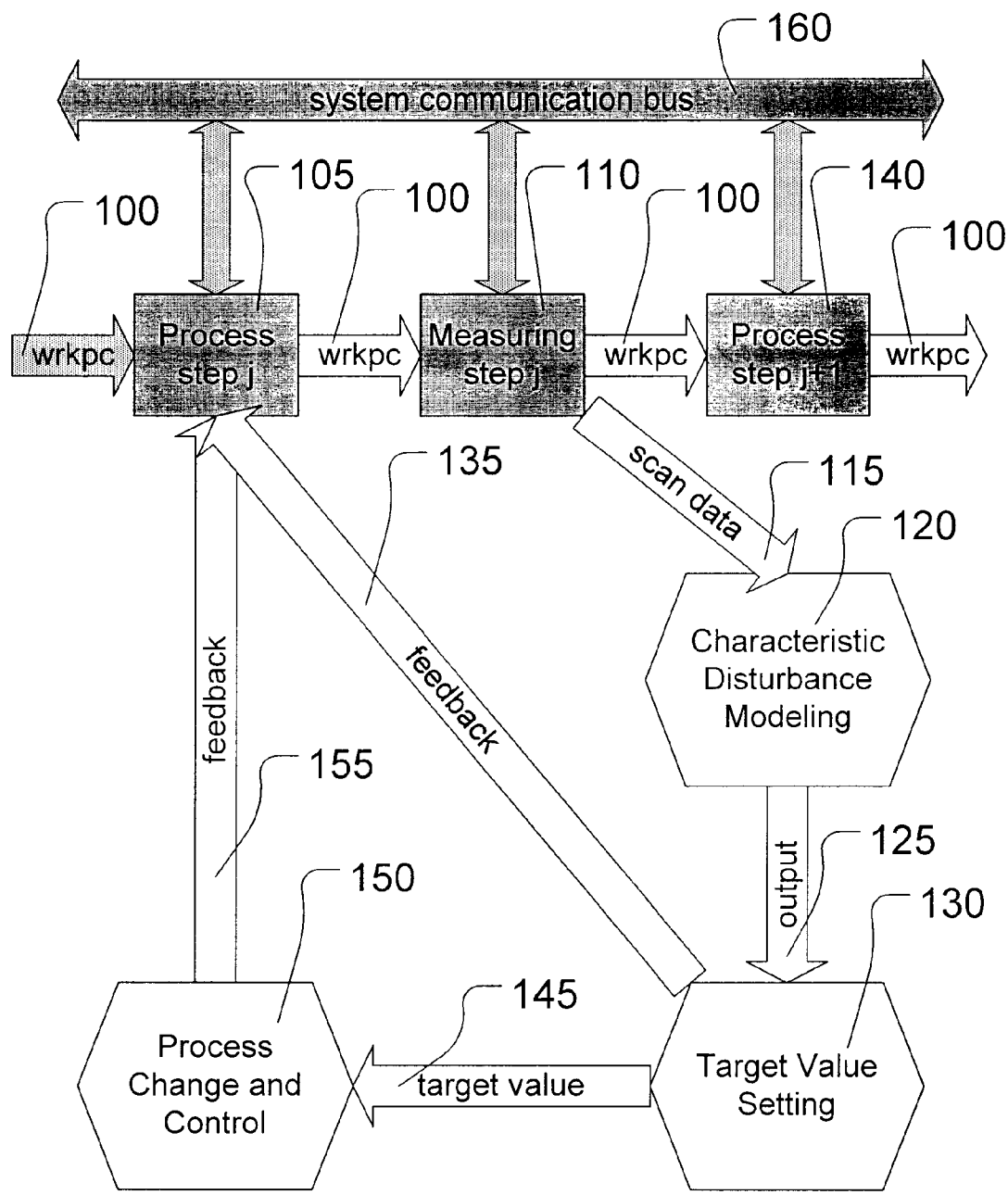
FIGS. 1–18 schematically illustrate various embodiments of a method for manufacturing according to the present invention; and, more particularly.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method for manufacturing according to the present invention are shown in FIGS. 1–18. As shown in FIG. 1, a workpiece 100, such as a semiconducting substrate or wafer, having one or more process layers and/or semiconductor devices such as an MOS transistor disposed thereon, for example, is delivered to a processing step j 105, where j may have any value from j=1 to j=N. The total number N of processing steps, such as masking, etching, depositing material and the like, used to form the finished workpiece 100, may range from N=1 to about any finite value. In various illustrative embodiments, the processing step j 105 may involve chemical-mechanical planarization (CMP). In various illustrative alternative embodiments, the processing step j 105 may involve photolithographic processing.

As shown in FIG. 1, a system communication bus 160 may be provided to facilitate communication between the processing step j 105, a measuring step j 110, and a further processing step j+1 140 for further processing, where j may have any value from j=1 to j=N, for a sequence of N total processing steps (when j=N, there will, of course, not be any further processing step N+1 140). Using the system communication bus 160, data and/or instructions may be exchanged between any or all of the various N processing and/or N measuring steps. In particular, using the system communication bus 160, scan data 115 from any measuring step j 110, where j may have any value from j=1 to j=N, may be exchanged between, and made available to, any or all of the various N processing and/or N measuring steps, which may, in turn, pass the scan data 115 on to any modeling step such as a characteristic disturbance modeling step 120.

Data that tracks the use of any particular processing tool that may be used in any or all of the various N processing steps may be exchanged between, and made available to, any or all of the various N processing and/or N measuring steps, using the system communication bus 160. This tracking data may, in turn, be passed on, like the scan data 115, to any modeling step such as a characteristic disturbance modeling step 120. In particular, data that tracks the use of a chemical-mechanical planarization (CMP) tool used in the processing step j 105 may be exchanged between, and made available to, any or all of the various N processing and/or N measuring steps, using the system communication bus 160.

The particular chemical-mechanical planarization (CMP) tool used in the processing step j 105 to process the workpiece 100 and/or a set of workpieces like the workpiece 100, may be tracked to identify the impact of that particular chemical-mechanical planarization (CMP) tool on a photolithography overlay parameter measurement. Modeling of the impact of that particular chemical-mechanical planarization (CMP) tool on photolithography overlay parameter measurements can enable more accurate photolithography overlay metrology.

In addition, tracking the use of a particular chemical-mechanical planarization (CMP) tool used in the processing step j 105 can be used to monitor the performance of that particular chemical-mechanical planarization (CMP) tool. If a particular chemical-mechanical planarization (CMP) tool used in the processing step j 105 begin to damage a photolithography overlay target structure, such as features 520, 525 and 530 (FIG. 5), described in more detail below, to an unacceptable degree, the particular chemical-mechanical planarization (CMP) tool used in the processing step j 105 may be identified as having abnormal performance. Consequently, tracking the use of a particular chemical-mechanical planarization (CMP) tool used in the processing step j 105 can be used to improve fault detection for the chemical-mechanical planarization (CMP) performed in the processing step j 105, where j may have any value from j=1 to j=N.

Among the benefits of tracking chemical-mechanical planarization (CMP) tool identifications, using the system communication bus 160, for example, are that the photolithography overlay metrology may become more accurate and less affected by damage to photolithography overlay target structures induced by chemical-mechanical planarization (CMP), and that fault detection may be performed on individual chemical-mechanical planarization (CMP) tools. These benefits may, in turn, improve the performance of the photolithography overlay metrology using the photolithography overlay target structures, as well as the performance of the chemical-mechanical planarization (CMP).

Figure 2:
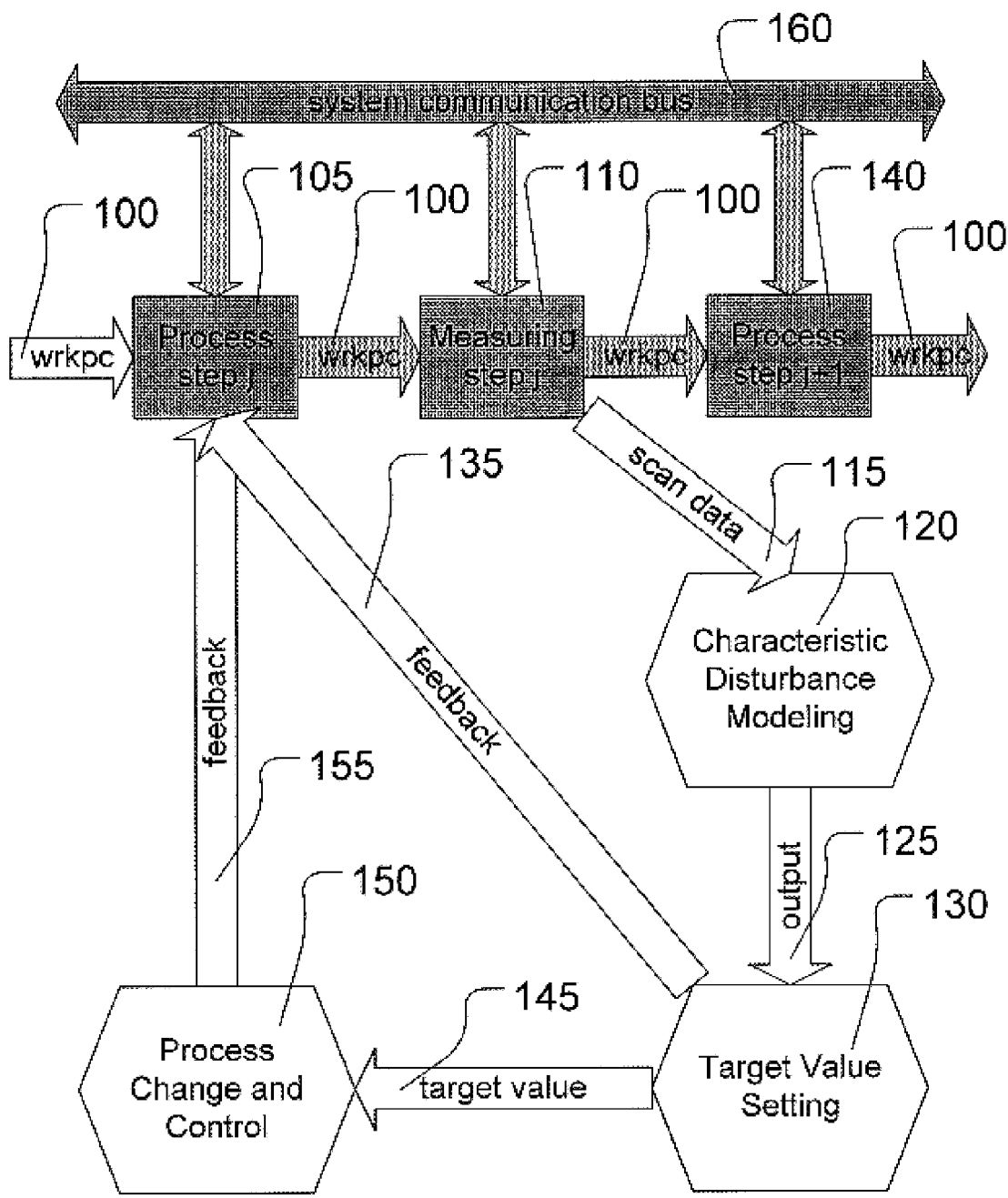

As shown in FIG. 2, the workpiece 100 is sent from the processing step j 105 and delivered to a measuring step j 110.

In the measuring step j 110, the workpiece 100 is measured by having a metrology or measuring tool (not shown) measure one or more parameters characteristic of the processing performed in any of the previous processing steps (such as processing step j 105, where j may have any value from j=1 to j=N). The measurements in the measuring step j 110 produce scan data 115 indicative of the one or more characteristic parameters measured in the measuring step j 110. As shown in FIG. 2, if there is further processing to do on the workpiece 100 (if j<N), then the workpiece 100 may be sent from the measuring step j 110 and delivered to a processing step j+1 140 for further processing, and then sent on from the processing step j+1 140.

Figure 3:
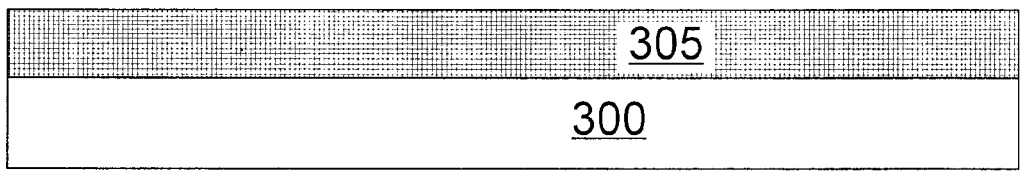

In various illustrative embodiments, there is further processing to do on the workpiece 100 (j<N) and the measuring step j 110 may be a photolithography overlay parameter measurement of a process layer formed on the workpiece 100. FIGS. 3–8 schematically illustrate photolithography overlay parameter measurements and photolithography overlay error. As shown in FIG. 3, a dielectric layer 305 may be formed above a structure layer 300, such as a semiconducting substrate (e.g., a silicon wafer). The dielectric layer 305 may be formed by a variety of known techniques for forming such layers, e.g., chemical vapor deposition (CVD), low-pressure CVD (LPCVD), plasma-enhanced CVD (PECVD), sputtering and physical vapor deposition (PVD), and the like, and may have a thickness ranging from approximately 100–2000 Å, for example. The dielectric layer 305 may be formed from a variety of dielectric materials and may, for example, be an oxide (e.g., Ge oxide), a nitride (e.g., GaAs nitride), an oxynitride (e.g., GaP oxynitride), silicon dioxide ($SiO_2$), a nitrogen-bearing oxide (e.g., nitrogen-bearing $SiO_2$), a nitrogen-doped oxide (e.g., $N_2$-implanted $SiO_2$), silicon nitride ($Si_3N_4$), silicon oxynitride ($Si_xO_yN_z$), and the like. In one illustrative embodiment, the dielectric layer 305 is comprised of a silicon dioxide ($SiO_2$) having a thickness of approximately 500 Å, which is formed by an LPCVD process for higher throughput.

Figure 4:
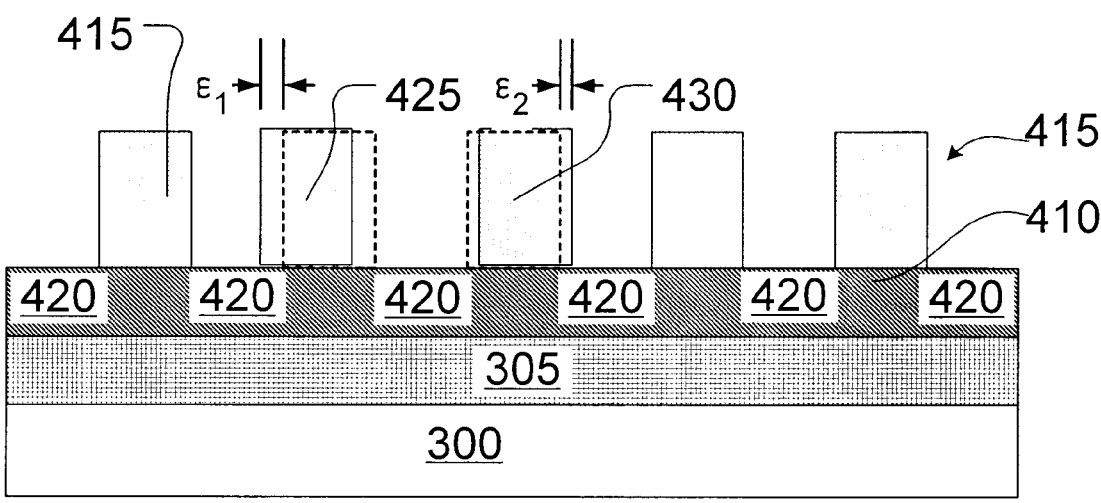

As shown in FIG. 4, a polycrystalline silicon or poly layer 410 may be formed above the dielectric layer 305. The poly layer 410 may be formed by a variety of known techniques for forming such layers, e.g., CVD, LPCVD, PECVD, PVD, and the like, and may have a thickness ranging from approximately 500–2000 Å. In one illustrative embodiment, the poly layer 410 has a thickness of approximately 1000 Å and is formed by an LPCVD process for higher throughput.

Figure 5:
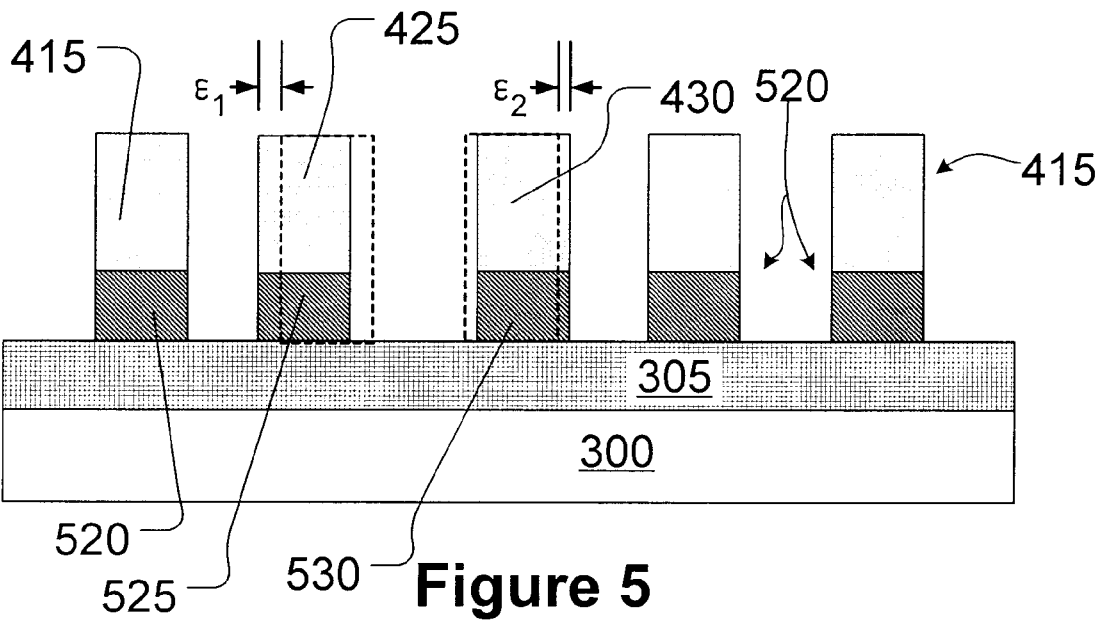

As shown in FIG. 4, a mask 415 of photoresist, for example, may be formed and patterned above the poly layer 410, exposing portions 420 of the poly layer 410. The photoresist mask 415 may have a thickness ranging from approximately 5000–15000 Å (5 kÅ–15 kÅ), for example. As shown in FIGS. 4–5, the portions 420 of the poly layer 410 may be removed, by being etched away, for example, using the photoresist mask 415, forming the features 520.

As shown in FIGS. 4–5, the features 520 may be formed using a variety of known photolithography and etching techniques, such as an anisotropic etching process using hydrogen bromide (HBr) and argon (Ar) as the etchant gases, for example. As shown in FIGS. 4–5, photoresist masks 425 and 430 may be formed with respective photolithography overlay errors $\epsilon_1$ and $\epsilon_2$, as indicated, from the positions where the photoresist masks 425 and 430 should be formed (shown in phantom). As a result of the respective photolithography overlay errors $\epsilon_1$ and $\epsilon_2$, corresponding features 525 and 530 may be formed in positions different from the positions where the features 525 and 530 should be formed (shown in phantom). An overlay measurement at the measuring step j 110 of features 525 and 530 would duly note photolithography overlay errors $\epsilon_1$ and $\epsilon_2$, respectively, and this would be reported in the scan data 115. The features 520, 525 and 530 may comprise a portion of a photolithography overlay target structure formed above the structure layer 300, such as a semiconducting substrate (e.g., a silicon wafer).

Figure 6:
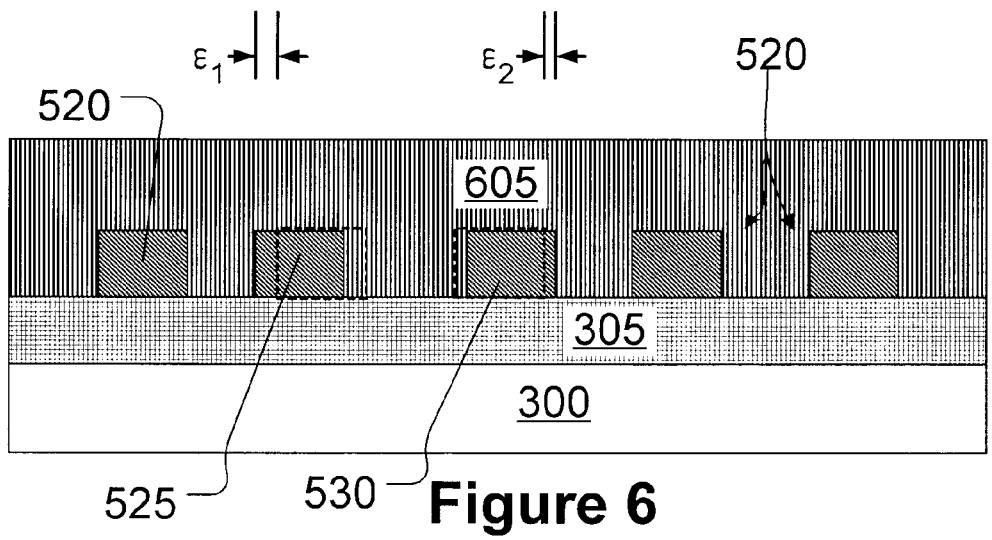

As shown in FIG. 6, another process layer, such as a second dielectric layer 605, may be formed above the features 520, 525 and 530. The second dielectric layer 605 may be formed by a variety of known techniques for forming such layers, e.g., chemical vapor deposition (CVD), low-pressure CVD (LPCVD), plasma-enhanced CVD (PECVD), sputtering and physical vapor deposition (PVD), and the like, and may have a thickness ranging from approximately 100–2000 Å, for example. The second dielectric layer 605 may be formed from a variety of dielectric materials and may, for example, be an oxide (e.g., Ge oxide), a nitride (e.g., GaAs nitride), an oxynitride (e.g., GaP oxynitride), silicon dioxide ($SiO_2$), a nitrogen-bearing oxide (e.g., nitrogen-bearing $SiO_2$), a nitrogen-doped oxide (e.g., $N_2$-implanted $SiO_2$), silicon nitride ($Si_3N_4$), silicon oxynitride ($Si_xO_yN_z$), and the like. In one illustrative embodiment, the second dielectric layer 605 is comprised of a silicon dioxide ($SiO_2$) having a thickness of approximately 1000 Å, which is formed by an LPCVD process for higher throughput.

Figure 7:
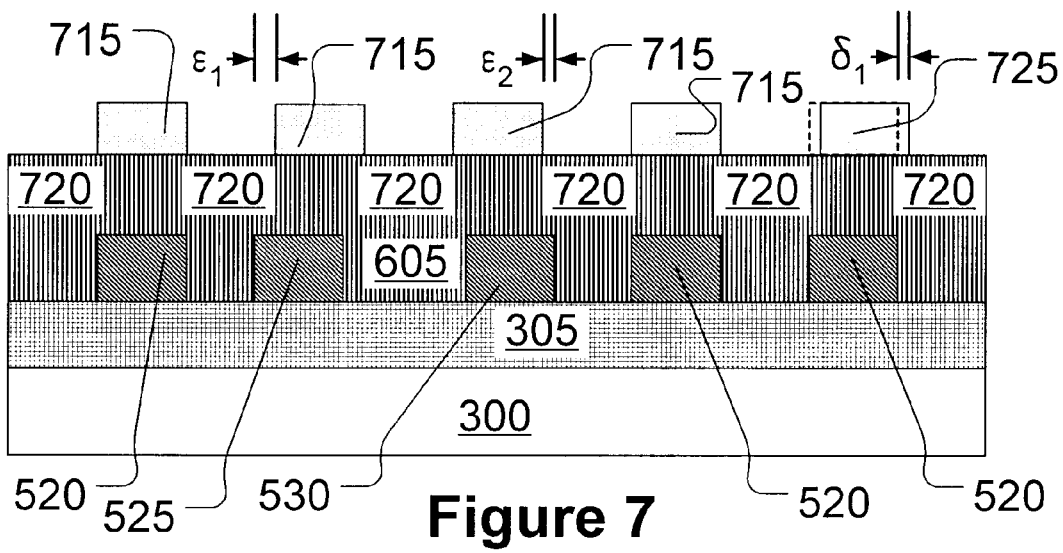
Figure 8:
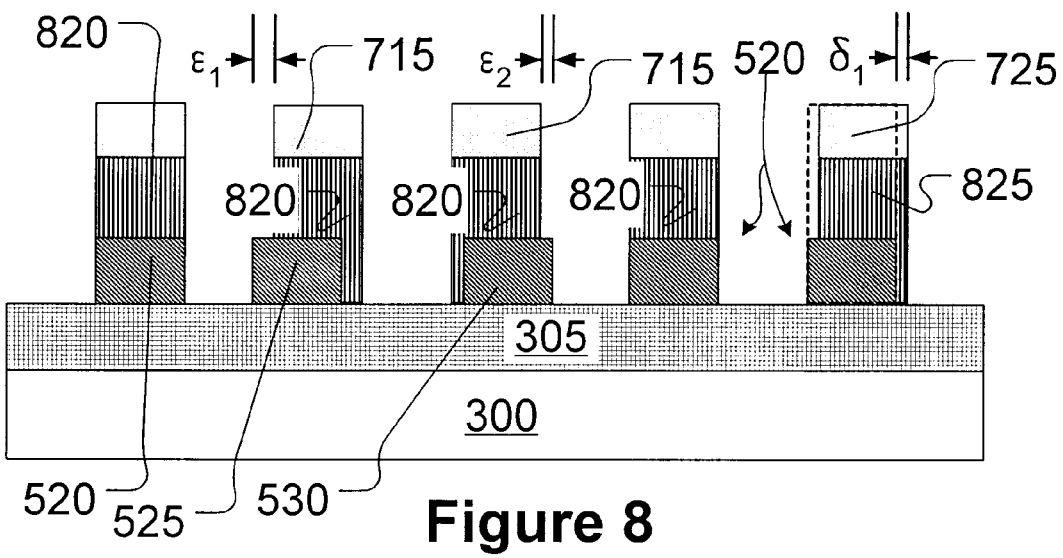

As shown in FIG. 7, a mask 715 of photoresist, for example, may be formed and patterned above the second dielectric layer 605, exposing portions 720 of the second dielectric layer 605. The photoresist mask 715 may have a thickness ranging from approximately 5000–15000 Å (5 kÅ–15 kÅ), for example. As shown in FIGS. 7–8, the portions 720 of the second dielectric layer 605 may be removed, by being etched away, for example, using the photoresist mask 715, forming the features 820.

As shown in FIGS. 7–8, the features 820 may be formed using a variety of known photolithography and etching techniques, such as an anisotropic etching process using hydrogen bromide (HBr) and argon (Ar) as the etchant gases, for example. As shown in FIGS. 7–8, photoresist mask 725 may be formed with a photolithography overlay errors $\delta_1$, as indicated, from the position where the photoresist mask 725 should be formed (shown in phantom). As a result of the respective photolithography overlay error $\delta_1$, corresponding feature 825 may be formed in a position different from the position where the feature 825 should be formed (shown in phantom). An overlay measurement at the measuring step j 110 of feature 825 would duly note photolithography overlay error $\delta_1$, and this would be reported in the scan data 115. The features 820 and 825 may comprise a further portion of the photolithography overlay target structure, comprising also the features 520, 525 and 530, formed above the structure layer 300, such as a semiconducting substrate (e.g., a silicon wafer).

Figure 9:
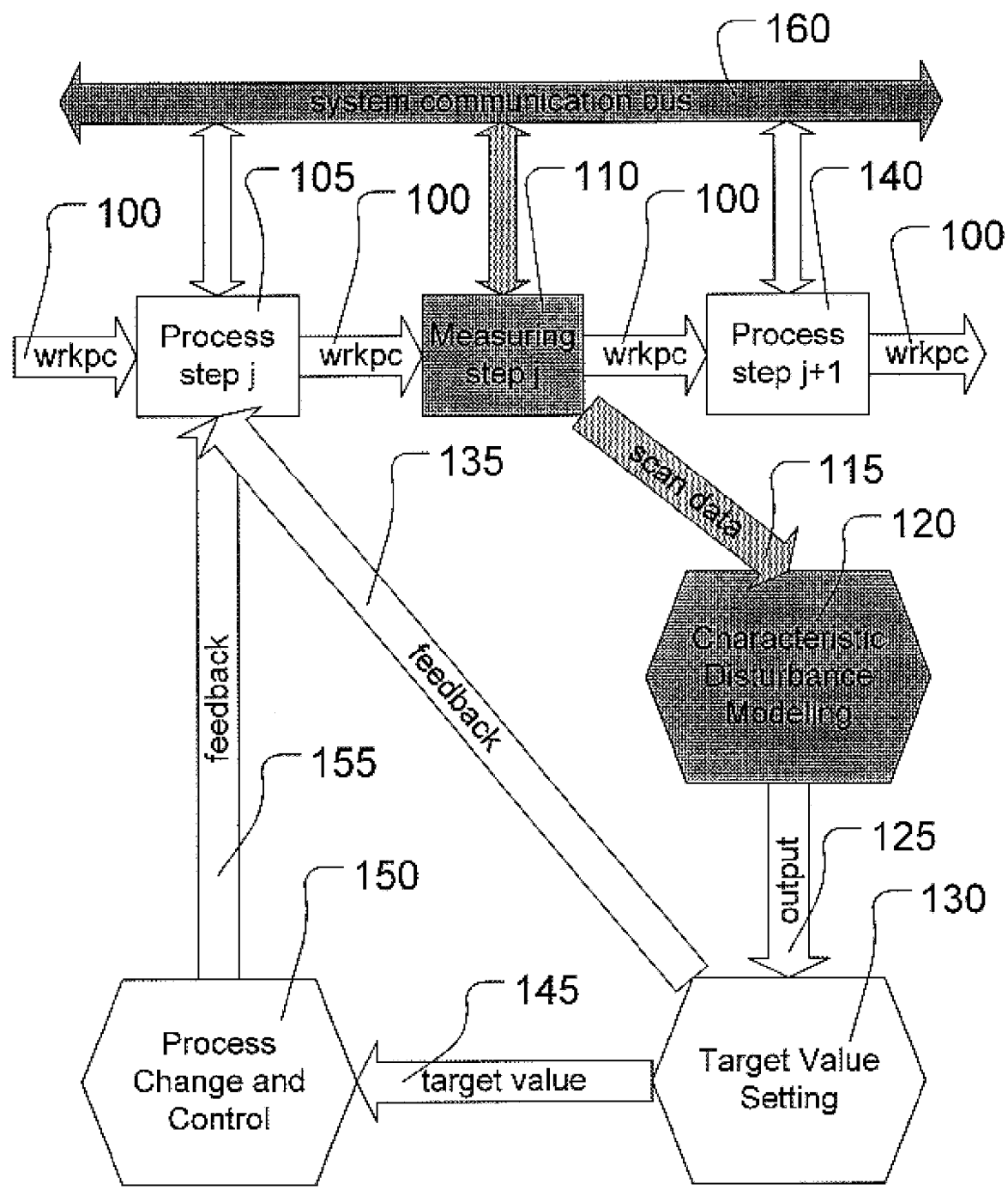

As: shown in FIG. 9, the scan data 115 is sent from the measuring step j 110 and delivered to a characteristic disturbance modeling step 120. In the characteristic disturbance modeling step 120, the one or more characteristic parameters measured in the measuring step j 110 may be input into a characteristic disturbance model. The characteristic disturbance model may map the one or more characteristic parameters measured in the measuring step j 110 onto one or more parameters that specify the processing performed in any of the previous and/or subsequent processing steps (such as processing step j 105, where j may have any value from j=1 to j=N). Delivering the scan data 115 to the characteristic disturbance model in the characteristic disturbance modeling step 120 produces an output signal 125. As shown in FIG. 9, using the system communication bus 160, scan data 115 from the measuring step j 110, where j may have any value from j=1 to j=N, may be exchanged between, and made available to, any or all of the various N processing and/or N measuring steps.

Figure 10:
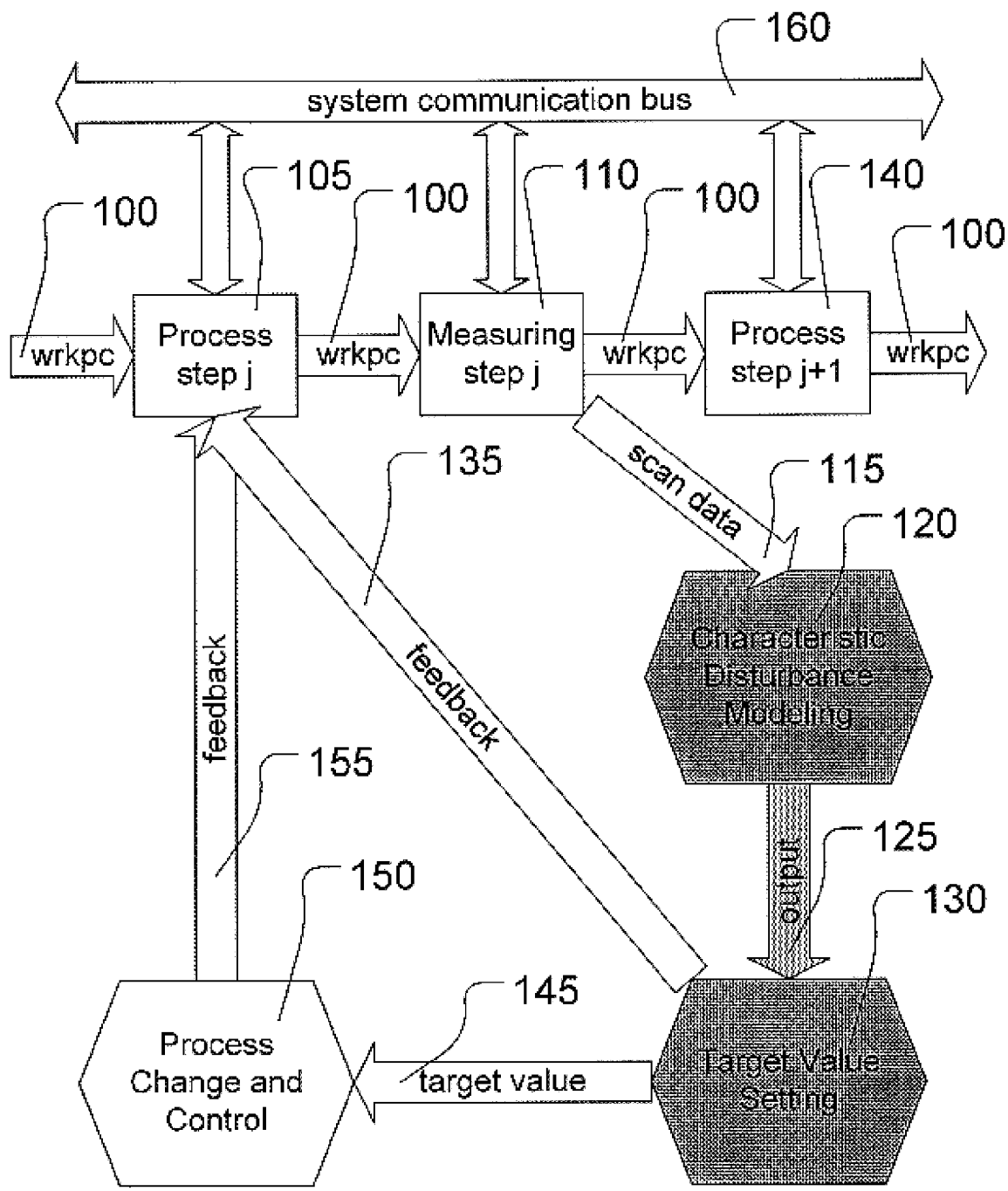

As shown in FIG. 10, the output signal 125 is sent from the characteristic disturbance modeling step 120 and delivered to a target value setting step 130. In the target value setting step 130, the characteristic disturbance model may be inverted to define one or more changes in the processing performed in any of the previous and/or subsequent processing steps (such as processing step j 105, where j may have any value from j=1 to j=N) that need to be made to bring the one or more characteristic parameter values measured in the measuring step j 110 within a range of specification values.

The inversion of the characteristic disturbance model (based on the output signal 125) in the target value setting step 130 may be used to alert an engineer of the need to adjust the processing performed any of the previous and/or subsequent processing steps (such as processing step j 105, where j may have any value from j=1 to j=N). The engineer may also alter, for example, the type of characteristic disturbance modeled in the characteristic disturbance modeling step 120, affecting the output signal 125 produced.

Figure 11:
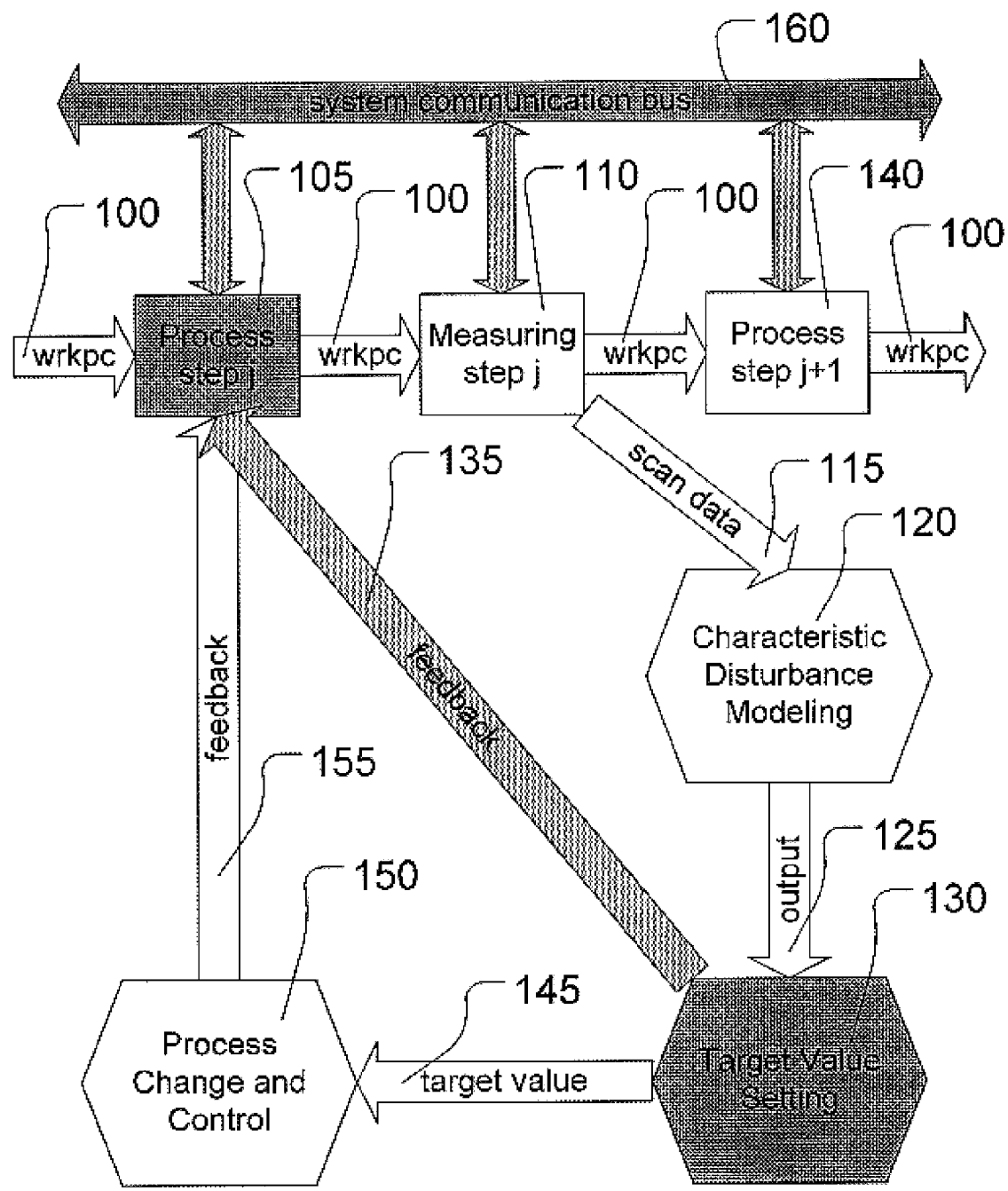

As shown in FIG. 11, a feedback control signal 135 may be sent from the target value setting step 130 to the processing step j 105 to adjust the processing performed in the processing step j 105. In various alternative illustrative embodiments (not shown), the feedback control signal 135 may be sent, using the system communication bus 160, for example, from the target value setting step 130 to any of the previous and/or subsequent processing steps (similar to processing step j 105, where j may have any value from j=1 to j=N) to adjust the processing performed in any of the previous and/or subsequent processing steps.

Figure 12:
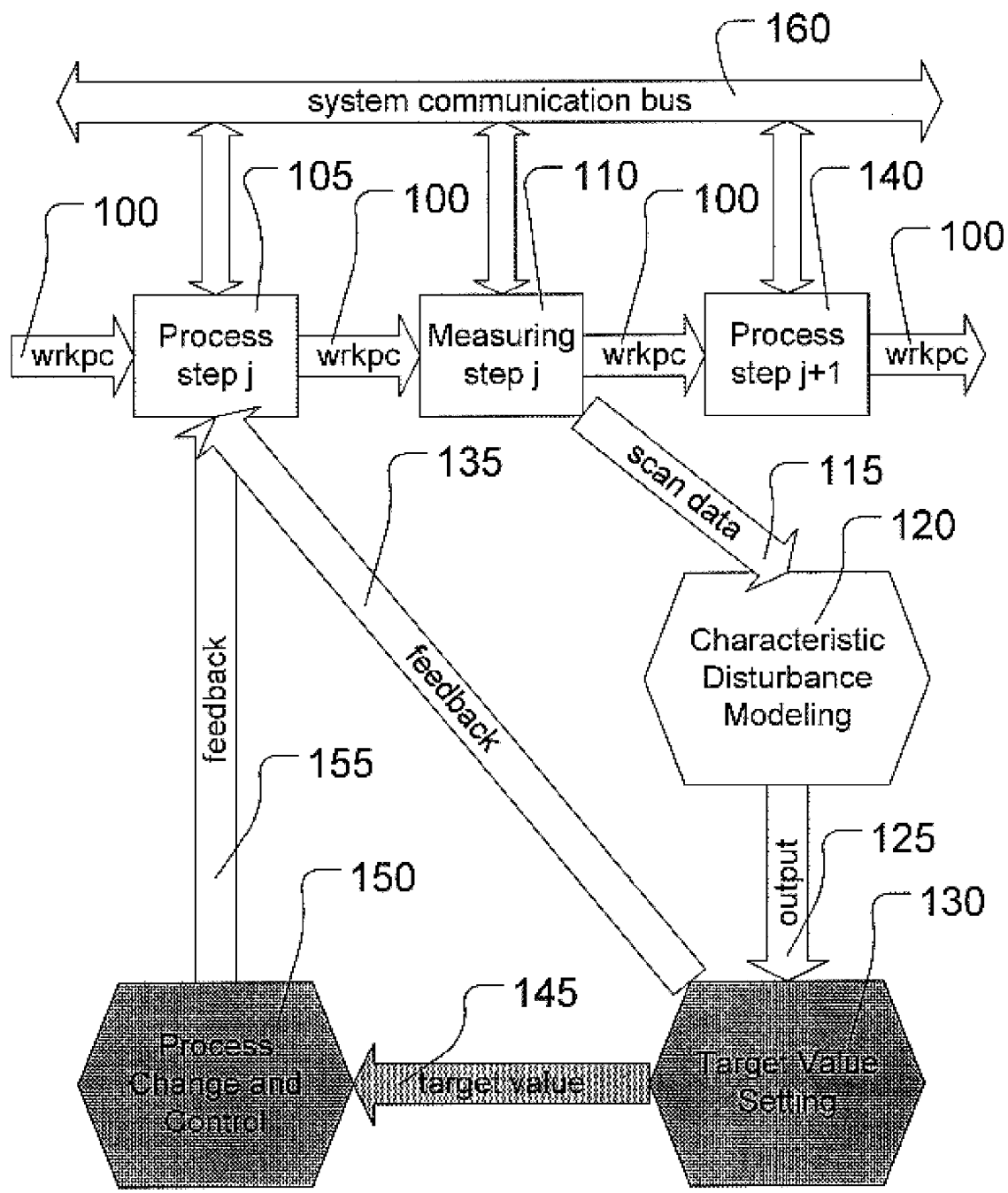
Figure 13:
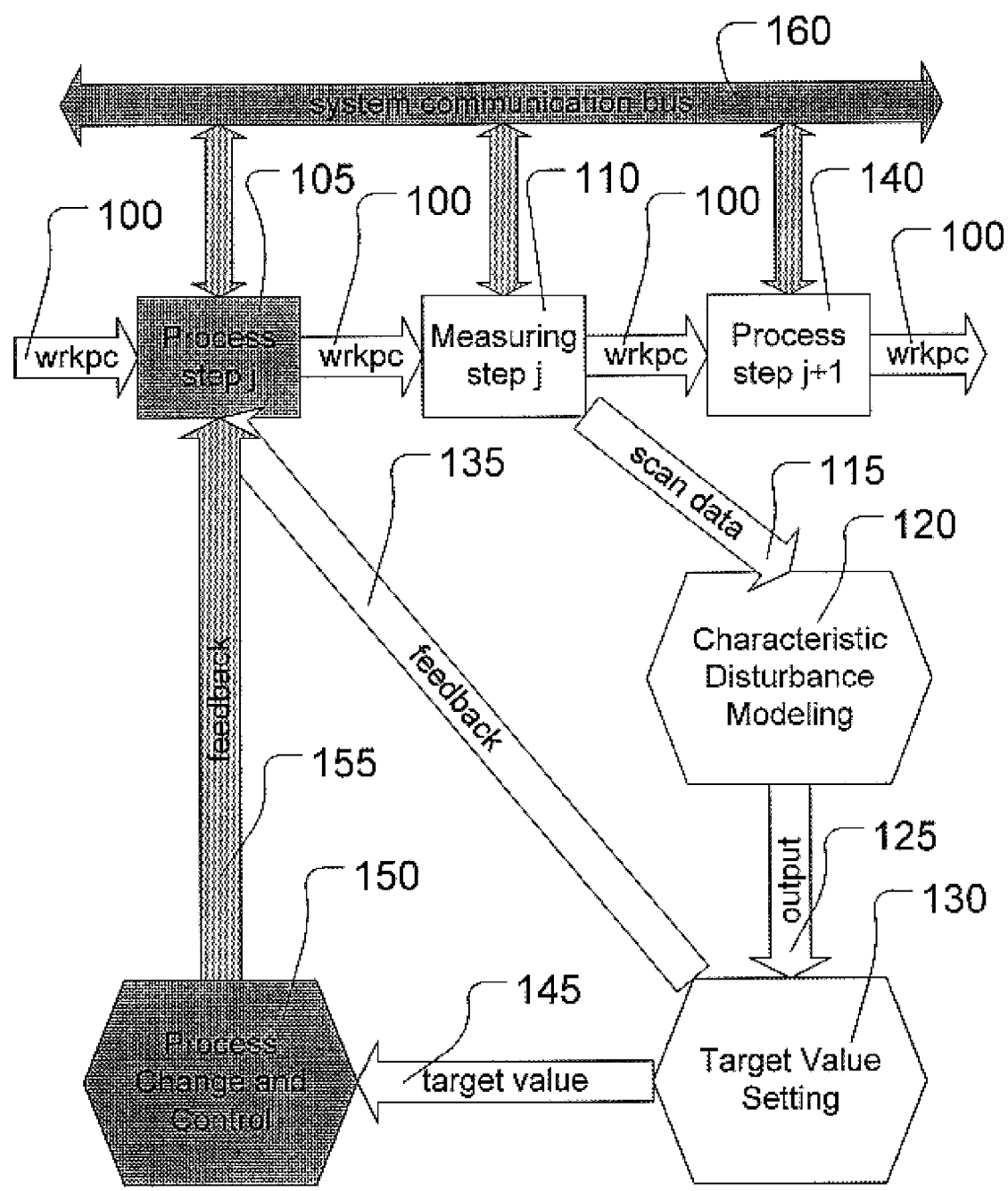

As shown in FIG. 12, in addition to, and/or instead of, the feedback control signal 135, target values 145 may be sent from the target value setting step 130 to a process change and control step 150. In the process change and control step 150, the target values 145 may be used in a high-level supervisory control loop. Thereafter, as shown in FIG. 13, a feedback control signal 155 may be sent from the process change and control step 150 to the processing step j 105 to adjust the processing performed in the processing step j 105. In various alternative illustrative embodiments (not shown), the feedback control signal 155 may be sent, using the system communication bus 160, for example, from the process change and control step 150 to any of the previous and/or subsequent processing steps (similar to processing step j 105, where j may have any value from j=1 to j=N) to adjust the processing performed in any of the previous and/or subsequent processing steps.

In various illustrative embodiments, the engineer may be provided with advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These capabilities may engender more optimal control of critical processing parameters, such as throughput accuracy, stability and repeatability, processing temperatures, mechanical tool parameters, and the like. This more optimal control of critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such an illustrative embodiment of a method of manufacturing according to the present invention, a monitoring and diagnostics system may be provided that monitors this variability and optimizes control of critical parameters.

Figure 14:
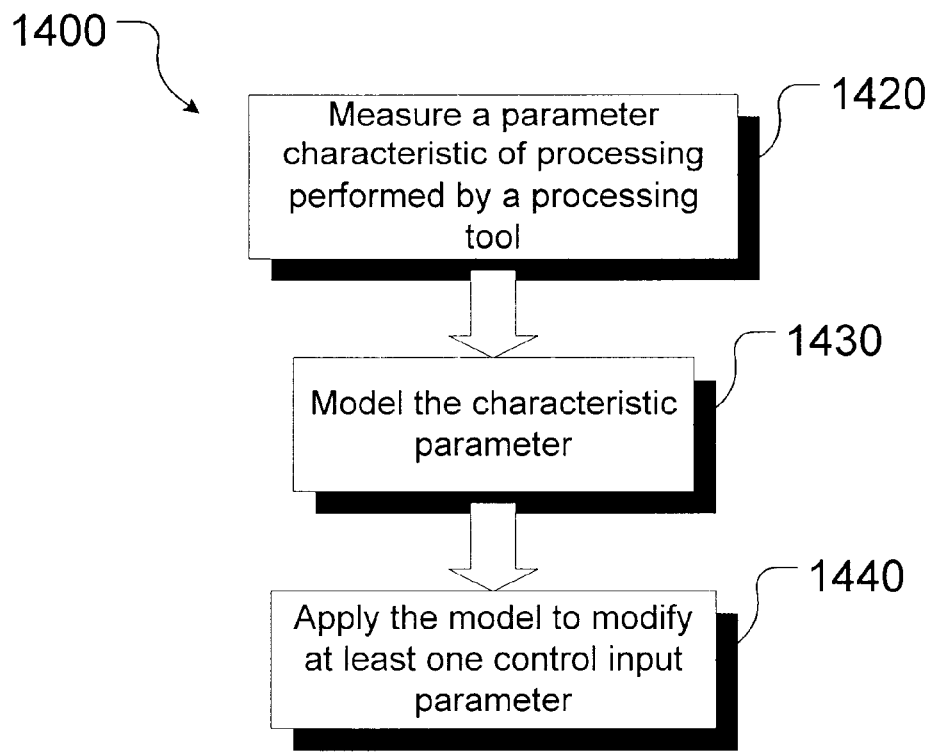
Figure 15:
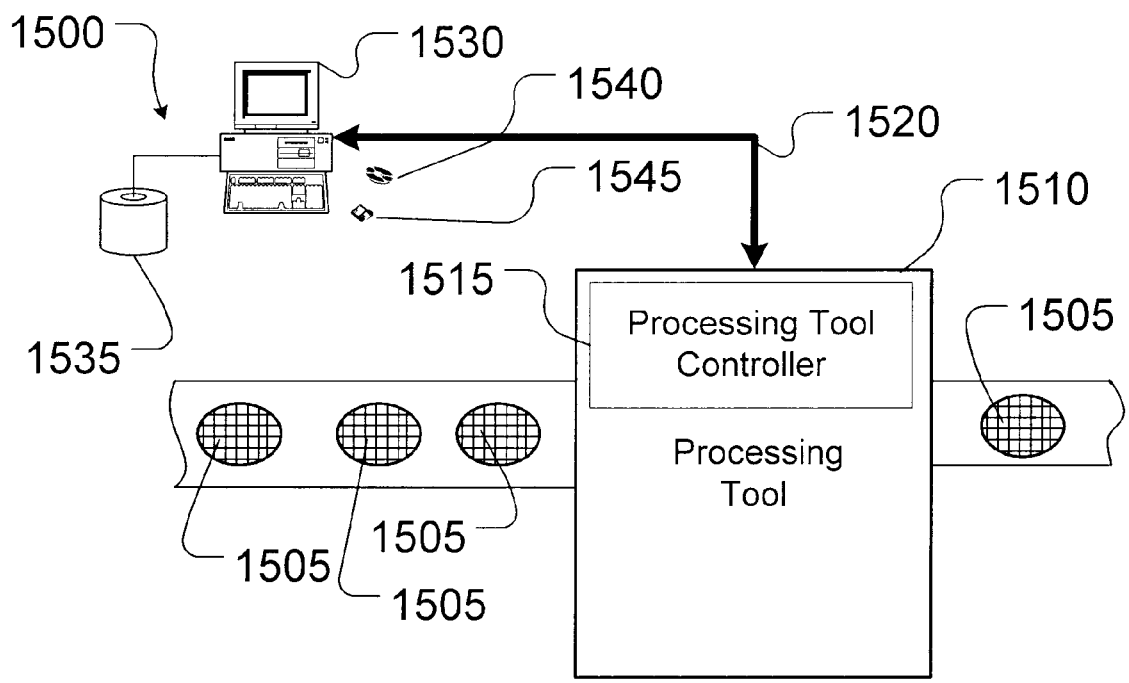

FIG. 14 illustrates one particular embodiment of a method 1400 practiced in accordance with the present invention. FIG. 15 illustrates one particular apparatus 1500 with which the method 1400 may be practiced. For the sake of clarity, and to further an understanding of the invention, the method 1400 shall be disclosed in the context of the apparatus 1500. However, the invention is not so limited and admits wide variation, as is discussed further below.

Referring now to both FIGS. 14 and 15, a batch or lot of workpieces or wafers 1505 is being processed through a processing tool 1510. The processing tool 1510 may be any processing tool known to the art, provided it comprises the requisite control capabilities. The processing tool 1510 comprises a processing tool controller 1515 for this purpose. The nature and function of the processing tool controller 1515 will be implementation specific. For example, in various illustrative embodiments, the processing tool 1510 may be a chemical-mechanical planarization (CMP) tool. In various illustrative alternative embodiments, the processing tool 1510 may be photolithography processing tool. For instance, a photolithography processing tool controller 1515 may control photolithography control input parameters such as a "stepper" x-translation signal, a stepper y-translation signal, an x-expansion wafer scale signal, a y-expansion wafer scale signal, a reticle magnification signal, and a reticle rotation signal, and the like. Four workpieces 1505 are shown in FIG. 15, but the lot of workpieces or wafers, i.e., the "wafer lot," may be any practicable number of wafers from one to any finite number.

The method 1400 begins, as set forth in box 1420, by measuring a parameter characteristic of the processing performed on the workpiece 1505 in the processing tool 1510. The nature, identity, and measurement of characteristic parameters will be largely implementation specific and even tool specific. For instance, capabilities for monitoring process parameters vary, to some degree, from tool to tool. Greater sensing capabilities may permit wider latitude in the characteristic parameters that are identified and measured and the manner in which this is done. Conversely, lesser sensing capabilities may restrict this latitude. For example, a photolithography tool may read the photolithography overlay error (POE) of features on a workpiece 1505 (see FIGS. 4–5 and 7–8), and/or an average of the photolithography overlay errors (POEs) of the workpieces 1505 in a lot, using a metrology tool (not shown), but this metrology tool may vary from wafer to wafer depending on the ambient temperature of the wafer(s). The photolithography overlay error (POE) metrology tool typically does not feedback the photolithography overlay error (POE) information to the photolithography tool. The photolithography overlay error (POE) of a workpiece 1505, and/or an average of the photolithography overlay errors (POEs) of the workpieces 1505 in a lot, is an illustrative example of a parameter characteristic of the processing performed on the workpiece in the processing tool 1510.

Turning to FIG. 15, in this particular embodiment, the process characteristic parameters are measured and/or monitored by tool sensors (not shown). The outputs of these tool sensors are transmitted to a computer system 1530 over a line 1520. The computer system 1530 analyzes these sensor outputs to identify the characteristic parameters.

Returning, to FIG. 14, once the characteristic parameter is identified and measured, the method 1400 proceeds by modeling the measured and identified characteristic parameter, as set forth in box 1430. The computer system 1530 in FIG. 15 is, in this particular embodiment, programmed to model the characteristic parameter. The manner in which this modeling occurs will be implementation specific.

In the embodiment of FIG. 15, a database 1535 stores a plurality of models that might potentially be applied, depending upon which characteristic parameter is identified. This particular embodiment, therefore, requires some a priori knowledge of the characteristic parameters that might be measured. The computer system 1530 then extracts an appropriate model from the database 1535 of potential models to apply to the identified characteristic parameters. If the database 1535 does not comprise an appropriate model, then the characteristic parameter may be ignored, or the computer system 1530 may attempt to develop one, if so programmed. The database 1535 may be stored on any kind of computer-readable, program storage medium, such as an optical disk 1540, a floppy disk 1545, or a hard disk drive (not shown) of the computer system 1530. The database 1535 may also be stored on a separate computer system (not shown) that interfaces with the computer system 1530.

Modeling of the identified characteristic parameter may be implemented differently in alternative embodiments. For instance, the computer system 1530 may be programmed using some form of artificial intelligence to analyze the sensor outputs and controller inputs to develop a model on-the-fly in a real-time implementation. This approach might be a useful adjunct to the embodiment illustrated in FIG. 15, and discussed above, where characteristic parameters are measured and identified for which the database 1535 has no appropriate model.

The method 1400 of FIG. 14 then proceeds by applying the model to modify a control input parameter, as set forth in box 1440. Depending on the implementation, applying the model may yield either a new value for the control input parameter or a correction to the existing control input parameter. The new control input is then formulated from the value yielded by the model and is transmitted to the processing tool controller 1515 over the line 1520. The processing tool controller 1515 then controls subsequent processing operations in accordance with the new control inputs.

Some alternative embodiments may employ a form of feedback to improve the modeling of characteristic parameters. The implementation of this feedback is dependent on several disparate facts, comprising the tool's sensing capabilities and economics. One technique for doing this would be to monitor at least one effect of the model's implementation and update the model based on the effect(s) monitored. The update may also depend on the model. For instance, a linear model may require a different update than would a non-linear model, all other factors being the same.

As is evident from the discussion above, some features of the present invention are implemented in software. For instance, the acts set forth in the boxes 1420–1440 in FIG. 14 are, in the illustrated embodiment, software-implemented, in whole or in part. Thus, some features of the present invention are implemented as instructions encoded on a computer-readable, program storage medium. The program storage medium may be of any type suitable to the particular implementation. However, the program storage medium will typically be magnetic, such as the floppy disk 1545 or the computer 1530 hard disk drive (not shown), or optical, such as the optical disk 1540. When these instructions are executed by a computer, they perform the disclosed functions. The computer may be a desktop computer, such as the computer 1530. However, the computer might alternatively be a processor embedded in the processing tool 1510. The computer might also be a laptop, a workstation, or a mainframe in various other embodiments. The scope of the invention is not limited by the type or nature of the program storage medium or computer with which embodiments of the invention might be implemented.

Thus, some portions of the detailed descriptions herein are, or may be, presented in terms of algorithms, functions, techniques, and/or processes. These terms enable those skilled in the art most effectively to convey the substance of their work to others skilled in the art. These terms are here, and are generally, conceived to be a self-consistent sequence of steps leading to a desired result. The steps are those requiring physical manipulations of physical quantities. Usually, though not necessarily, these quantities take the form of electromagnetic signals capable of being stored, transferred, combined, compared, and otherwise manipulated.

It has proven convenient at times, principally for reasons of common usage, to refer to these signals as bits, values, elements, symbols, characters, terms, numbers, and the like. All of these and similar terms are to be associated with the appropriate physical quantities and are merely convenient labels applied to these quantities and actions. Unless specifically stated otherwise, or as may be apparent from the discussion, terms such as "processing," "computing," "calculating," "determining," "displaying," and the like, used herein refer to the action(s) and processes of a computer system, or similar electronic and/or mechanical computing device, that manipulates and transforms data, represented as physical (electromagnetic) quantities within the computer system's registers and/or memories, into other data similarly represented as physical quantities within the computer system's memories and/or registers and/or other such information storage, transmission and/or display devices.

Figure 16:
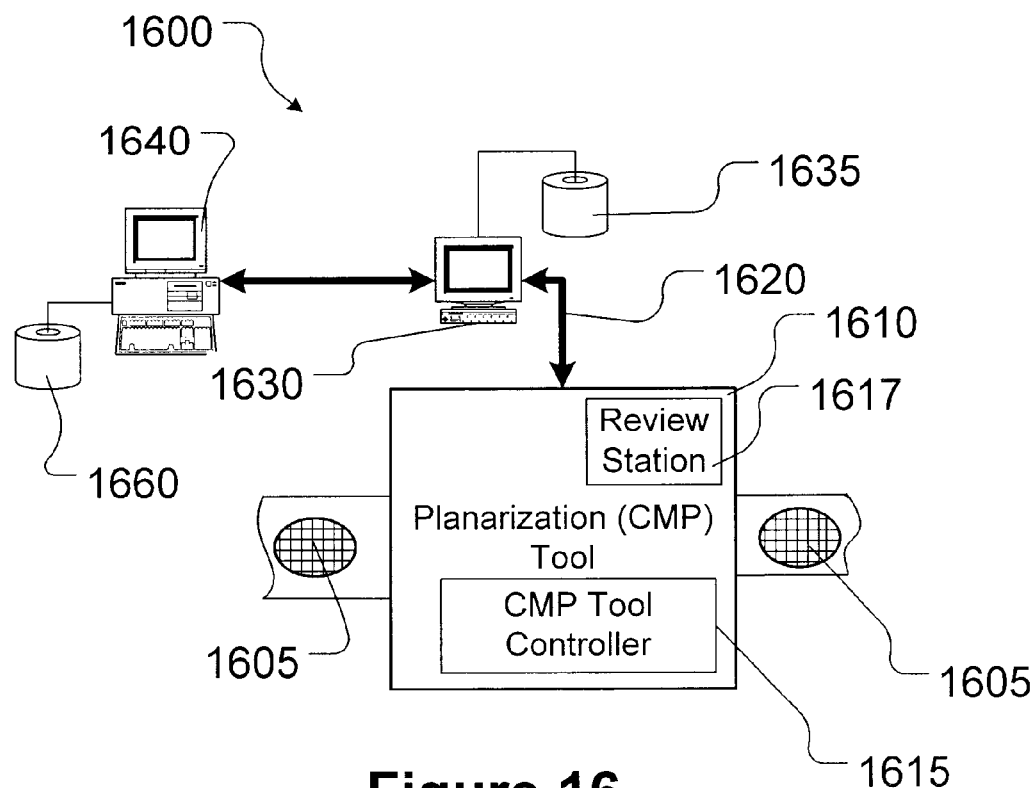
Figure 17:
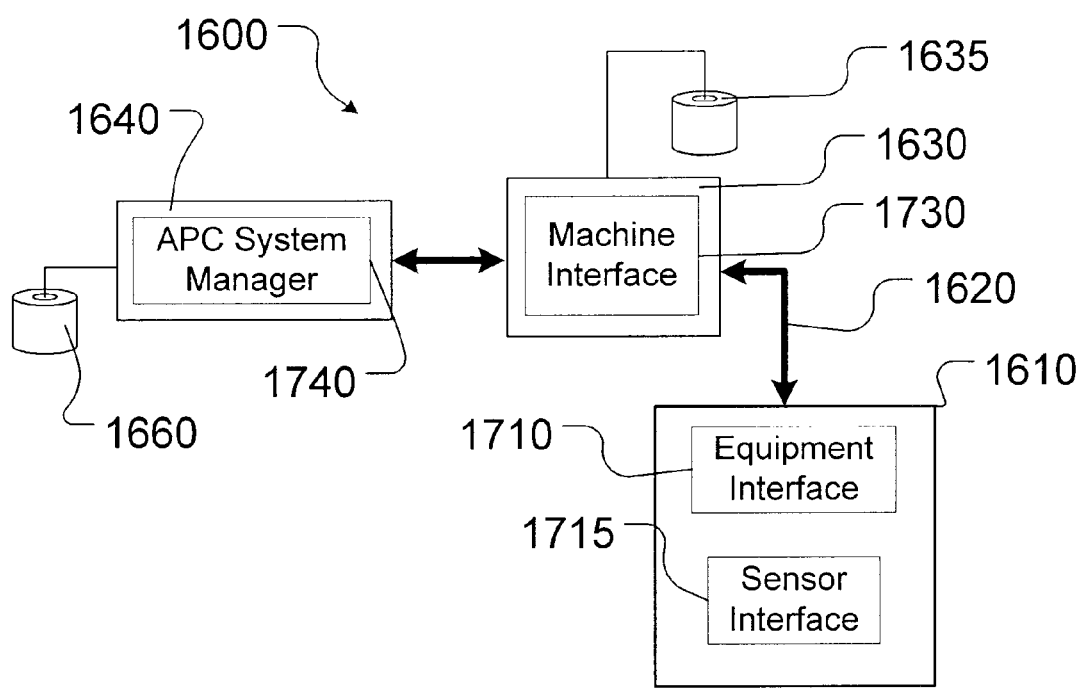

Construction of an Illustrative Apparatus. An exemplary embodiment 1600 of the apparatus 1500 in FIG. 15 is illustrated in FIGS. 16–17, in which the apparatus 1600 comprises a portion of an Advanced Process Control ("APC") system. FIGS. 16–17 are conceptualized, structural and functional block diagrams, respectively, of the apparatus 1600. A set of processing steps is performed on a lot of wafers 1605 on a processing tool 1610. Because the apparatus 1600 is part of an APC system, the workpieces 1605 are processed on a run-to-run basis. Thus, process adjustments are made and held constant for the duration of a run, based on run-level measurements or averages. A "run" may be a lot, a batch of lots, or even an individual wafer.

In this particular embodiment, the workpieces 1605 are processed by a chemical-mechanical planarization (CMP) tool 1610 and various operations in the process are controlled by a plurality of chemical-mechanical planarization (CMP) control input signals on a line 1620 between the processing tool 1610 and a workstation 1630. Exemplary chemical-mechanical planarization (CMP) control inputs for this embodiment might comprise tool identity, tool maintenance, tool usage records, polisher rotational speed, polishing pressure, and the like.

When a process step in the chemical-mechanical planarization (CMP) tool 1610 is concluded, the workpieces 1605 being processed in the chemical-mechanical planarization (CMP) tool 1610 are examined in a review station 1617. The chemical-mechanical planarization (CMP) control inputs generally affect the photolithography overlay error (POE) of the workpieces 1605 and, hence, the variability and properties of the features patterned by the processing tool 1610 on the workpieces 1605. The photolithography overlay error (POE) or errors may be measured, as described above, using one or more photolithography overlay target structures (FIGS. 3–8). Once errors are determined from the examination after the run of a lot of workpieces 1605, the chemical-mechanical planarization (CMP) control inputs on the line 1620 are modified for a subsequent run of a lot of workpieces 1605. Modifying the control signals on the line 1620 is designed to improve the next process step in the chemical-mechanical planarization (CMP) tool 1610. The modification is performed in accordance with one particular embodiment of the method 1400 set forth in FIG. 14, as described more fully below. Once the relevant chemical-mechanical planarization (CMP) control input signals for the processing tool 1610 are updated, the chemical-mechanical planarization (CMP) control input signals with new settings are used for a subsequent run of semiconductor devices.

Referring now to both FIGS. 16 and 17, the chemical-mechanical planarization (CMP) tool 1610 communicates with a manufacturing framework comprising a network of processing modules. One such module is an APC system manager 1740 resident on the computer 1640. This network of processing modules constitutes the APC system. The chemical-mechanical planarization (CMP) tool 1610 generally comprises an equipment interface 1710 and a sensor interface 1715. A machine interface 1730 resides on the workstation 1630. The machine interface 1730 bridges the gap between the APC framework, e.g., the APC system manager 1740, and the equipment interface 1710. Thus, the machine interface 1730 interfaces the chemical-mechanical planarization (CMP) tool 1610 with the APC framework and supports machine setup, activation, monitoring, and data collection. The sensor interface 1715 provides the appropriate interface environment to communicate with external sensors such as LabView® or other sensor bus-based data acquisition software. Both the machine interface 1730 and the sensor interface 1715 use a set of functionalities (such as a communication standard) to collect data to be used. The equipment interface 1710 and the sensor interface 1715 communicate over the line 1620 with the machine interface 1730 resident on the workstation 1630.

More particularly, the machine interface 1730 receives commands, status events, and collected data from the equipment interface 1710 and forwards these as needed to other APC components and event channels. In turn, responses from APC components are received by the machine interface 1730 and rerouted to the equipment interface 1710. The machine interface 1730 also reformats and restructures messages and data as necessary. The machine interface 1730 supports the startup/shutdown procedures within the APC System Manager 1740. It also serves as an APC data collector, buffering data collected by the equipment interface 1710, and emitting appropriate data collection signals.

In the particular embodiment illustrated, the APC system is a factory-wide software system, but this is not necessary to the practice of the invention. The control strategies taught by the present invention can be applied to virtually any semiconductor processing tool on a factory floor. Indeed, the present invention may be simultaneously employed on multiple processing tools in the same factory or in the same fabrication process. The APC framework permits remote access and monitoring of the process performance. Furthermore, by utilizing the APC framework, data storage can be more convenient, more flexible, and less expensive than data storage on local drives. However, the present invention may be employed, in some alternative embodiments, on local drives.

The illustrated embodiment deploys the present invention onto the APC framework utilizing a number of software components. In addition to components within the APC framework, a computer script is written for each of the semiconductor processing tools involved in the control system. When a semiconductor processing tool in the control system is started in the semiconductor manufacturing fab, the semiconductor processing tool generally calls upon a script to initiate the action that is required by the processing tool controller. The control methods are generally defined and performed using these scripts. The development of these scripts can comprise a significant portion of the development of a control system.

In this particular embodiment, there are several separate software scripts that perform the tasks involved in controlling the chemical-mechanical planarization (CMP) operation. There is one script for the processing tool 1610, comprising the review station 1617 and the processing tool controller 1615. There is also a script to handle the actual data capture from the review station 1617 and another script that contains common procedures that can be referenced by any of the other scripts. There is also a script for the APC system manager 1740. The precise number of scripts, however, is implementation specific and alternative embodiments may use other numbers of scripts.

Figure 18:
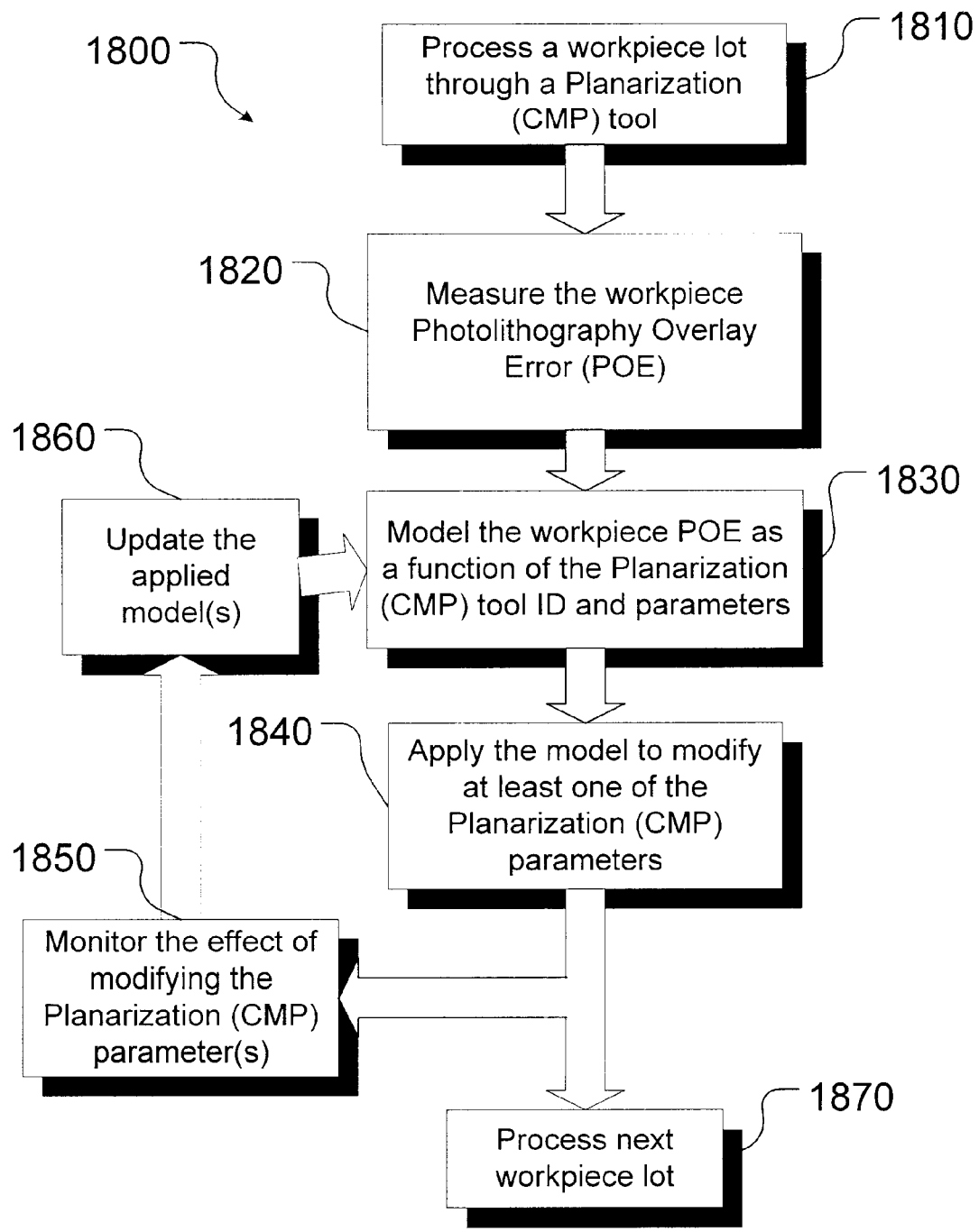

Operation of an Illustrative Apparatus. FIG. 18 illustrates one particular embodiment 1800 of the method 1400 in FIG. 14. The method 1800 may be practiced with the apparatus 1600 illustrated in FIGS. 16–17, but the invention is not so limited. The method 1800 may be practiced with any apparatus that may perform the functions set forth in FIG. 18. Furthermore, the method 1400 in FIG. 14 may be practiced in embodiments alternative to the method 1800 in FIG. 18.

Referring now to all of FIGS. 17–18, the method 1800 begins with processing a lot of workpieces or wafers 1605 through a processing tool 1610, as set forth in box 1810. In this particular embodiment, the processing tool 1610 has been initialized for processing by the APC system manager 1740 through the machine interface 1730 and the equipment interface 1710. In this particular embodiment, before the processing tool 1610 is run, the APC system manager script is called to initialize the processing tool 1610. At this step, the script records the identification number of the processing tool 1610 and the lot number of the workpieces or wafers 1605. The identification number is then stored against the lot number in a data store 1660. The rest of the script, such as the APCData call and the Setup and StartMachine calls, are formulated with blank or dummy data in order to force the machine to use default settings.

As part of this initialization, the initial setpoints for chemical-mechanical planarization (CMP) control are provided to the processing tool controller 1615 over the line 1620. These initial setpoints may be determined and implemented in any suitable manner known to the art. In the particular embodiment illustrated, chemical-mechanical planarization (CMP) controls are implemented by control threads. Each control thread acts like a separate controller and is differentiated by various process conditions. For chemical-mechanical planarization (CMP) control, the control threads are separated by a combination of different conditions. These conditions may comprise, for example, the semiconductor processing tool 1610 currently processing the workpiece or wafer lot, the semiconductor product, the semiconductor manufacturing operation, and one or more of the semiconductor processing tools (not shown) that previously processed the semiconductor workpiece or wafer lot.

Control threads are separated because different process conditions affect the photolithography overlay error (POE) differently. By isolating each of the process conditions into its own corresponding control thread, the photolithography overlay error (POE) can become a more accurate portrayal of the conditions in which a subsequent semiconductor workpiece or wafer lot in the control thread will be processed. Since the error measurement is more relevant, changes to the chemical-mechanical planarization (CMP) control input signals based upon the error will be more appropriate.

The control thread for the chemical-mechanical planarization (CMP) control scheme depends upon the current processing tool, current operation, the product code for the current lot, and the identification number at a previous processing step. The first three parameters are generally found in the context information that is passed to the script from the processing tool 1610. The fourth parameter is generally stored when the lot is previously processed. Once all four parameters are defined, they are combined to form the control thread name; CMPP02$_{13}$ OPER01_PROD01_CMPP01 is an example of a control thread name. The control thread name is also stored in correspondence to the workpiece or wafer lot number in the data store 1660.

Once the lot is associated with a control thread name, the initial settings for that control thread are generally retrieved from the data store 1660. There are at least two possibilities when the call is made for the information. One possibility is that there are no settings stored under the current control thread name. This can happen when the control thread is new, or if the information was lost or deleted. In these cases, the script initializes the control thread assuming that there is no error associated with it and uses the target values of the photolithography errors as the chemical-mechanical planarization (CMP) control input settings. It is preferred that the controllers use the default machine settings as the initial settings. By assuming some settings, the photolithography errors can be related back to the chemical-mechanical planarization (CMP) control settings in order to facilitate feedback control.

Another possibility is that the initial settings are stored under the control thread name. In this case, one or more workpiece or wafer lots have been processed under the same control thread name as the current workpiece or wafer lot, and have also been measured for photolithography error using the review station 1617. When this information exists, the chemical-mechanical planarization (CMP) control input signal settings are retrieved from the data store 1660. These settings are then downloaded to the processing tool 1610.

The workpieces or wafers 1605 are processed through the processing tool 1610. This comprises, in the embodiment illustrated, chemical-mechanical planarization (CMP), as discussed above. The workpieces or wafers 1605 are measured on the review station 1617 after their chemical-mechanical planarization (CMP) on the processing tool 1610. The review station 1617 examines the workpieces or wafers 1605 after they are processed for a number of errors.

The data generated by the instruments of the review station 1617 is passed to the machine interface 1730 via sensor interface 1715 and the line 1620. The review station script begins with a number of APC commands for the collection of data. The review station script then locks itself in place and activates a data available script. This script facilitates the actual transfer of the data from the review station 1617 to the APC framework. Once the transfer is completed, the script exits and unlocks the review station script. The interaction with the review station 1617 is then generally complete.

As will be appreciated by those skilled in the art having the benefit of this disclosure, the data generated by the review station 1617 should be preprocessed for use. Review stations, such as KLA review stations, provide the control algorithms for measuring the control error. Each of the error measurements, in this particular embodiment, corresponds to one or more of the chemical-mechanical planarization (CMP) control input signals on the line 1620 in a direct manner. Before the error can be utilized to correct the chemical-mechanical planarization (CMP) control input signal, a certain amount of preprocessing is generally completed.

For example, preprocessing may comprise outlier rejection. Outlier rejection is a gross error check ensuring that the received data is reasonable in light of the historical performance of the process. This procedure involves comparing each of the photolithography errors to its corresponding predetermined boundary parameter. In one embodiment, even if one of the predetermined boundaries is exceeded, the error data from the entire semiconductor workpiece or wafer lot is generally rejected.

To determine the limits of the outlier rejection, thousands of actual semiconductor manufacturing fabrication ("fab") data points are collected. The standard deviation for each error parameter in this collection of data is then calculated. In one embodiment, for outlier rejection, nine times the standard deviation (both positive and negative) is generally chosen as the predetermined boundary. This was done primarily to ensure that only the points that are significantly outside the normal operating conditions of the process are rejected.

Preprocessing may also smooth the data, which is also known as filtering. Filtering is important because the error measurements are subject to a certain amount of randomness, such that the error significantly deviates in value. Filtering the review station data results in a more accurate assessment of the error in the chemical-mechanical planarization (CMP) control input signal settings. In one embodiment, the chemical-mechanical planarization (CMP) control scheme utilizes a filtering procedure known as an Exponentially-Weighted Moving Average ("EWMA") filter, although other filtering procedures can be utilized in this context.

One embodiment for the EWMA filter is represented by Equation (1):

$$AVG_N = W^*M_C + (1-W)^*AVG_P \qquad (1)$$

where $AVG_N$=the new EWMA average;

W=a weight for the new average ($AVG_N$);

$M_C$=the current measurement; and $AVG_P$=the previous EWMA average.

The weight is an adjustable parameter that can be used to control the amount of filtering and is generally between zero and one. The weight represents the confidence in the accuracy of the current data point. If the measurement is considered accurate, the weight should be close to one. If there were a significant amount of fluctuations in the process, then a number closer to zero would be appropriate.

In one embodiment, there are at least two techniques for utilizing the EWMA filtering process. The first technique uses the previous average, the weight, and the current measurement as described above. Among the advantages of utilizing the first implementation are ease of use and minimal data storage. One of the disadvantages of utilizing the first implementation is that this method generally does not retain much process information. Furthermore, the previous average calculated in this manner would be made up of every data point that preceded it, which may be undesirable. The second technique retains only some of the data and calculates the average from the raw data each time.

The manufacturing environment in the semiconductor manufacturing fab presents some unique challenges. The order that the semiconductor workpiece or wafer lots are processed through a processing tool may not correspond to the order in which they are read on the review station. This could lead to the data points being added to the EWMA average out of sequence. Semiconductor workpiece or wafer lots may be analyzed more than once to verify the error measurements. With no data retention, both readings would contribute to the EWMA average, which may be an undesirable characteristic. Furthermore, some of the control threads may have low volume, which may cause the previous average to be outdated such that it may not be able to accurately represent the error in the chemical-mechanical planarization (CMP) control input signal settings.

The processing tool controller 1615, in this particular embodiment, uses limited storage of data to calculate the EWMA filtered error, i.e., the first technique. Workpiece or wafer lot data, comprising the lot number, the time the lot was processed, and the multiple error estimates, are stored in the data store 1660 under the control thread name. When a new set of data is collected, the stack of data is retrieved from data store 1660 and analyzed. The lot number of the current lot being processed is compared to those in the stack. If the lot number matches any of the data present there, the error measurements are replaced. Otherwise, the data point is added to the current stack in chronological order, according to the time periods when the lots were processed. In one embodiment, any data point within the stack that is over 148 hours old is removed. Once the aforementioned steps are complete, the new filter average is calculated and stored to data store 1660.

Thus, the data is collected and preprocessed, and then processed to generate an estimate of the current errors in the chemical-mechanical planarization (CMP) control input signal settings. First, the data is passed to a compiled Matlab® plug-in that performs the outlier rejection criteria described above. The inputs to a plug-in interface are the multiple error measurements and an array containing boundary values. The return from the plug-in interface is a single toggle variable. A nonzero return denotes that it has failed the rejection criteria, otherwise the variable returns the default value of zero and the script continues to process.

After the outlier rejection is completed, the data is passed to the EWMA filtering procedure. The controller data for the control thread name associated with the lot is retrieved, and all of the relevant operation upon the stack of lot data is carried out. This comprises replacing redundant data or removing older data. Once the data stack is adequately prepared, it is parsed into ascending time-ordered arrays that correspond to the error values. These arrays are fed into the EWMA plug-in along with an array of the parameter required for its execution. In one embodiment, the return from the plug-in is comprised of the six filtered error values.

Returning to FIG. 18, data preprocessing comprises measuring a characteristic parameter in a photolithography operation, such as workpiece 1605 photolithography overlay error (POE), arising from chemical-mechanical planarization (CMP) control of the processing tool 1610, as set forth in box 1820. Known, potential characteristic parameters may be identified by characteristic data patterns or may be identified as known consequences of modifications to critical dimension control. For example, modeling of how changes in the photolithography overlay error (POE) reflect an impact of the use of a particular chemical-mechanical planarization (CMP) tool falls into this latter category.

The next step in the control process is to calculate the new settings for the processing tool controller 1615 of the processing tool 1610. The previous settings for the control thread corresponding to the current workpiece or wafer lot are retrieved from the data store 1660. This data is paired along with the current set of photolithography overlay errors. The new settings are calculated by calling a compiled Matlab® plug-in. This application incorporates a number of inputs, performs calculations in a separate execution component, and returns a number of outputs to the main script. Generally, the inputs of the Matlab® plug-in are the chemical-mechanical planarization (CMP) control input signal settings, the review station errors, an array of parameters that are necessary for the control algorithm, and a currently unused flag error. The outputs of the Matlab® plug-in are the new controller settings, calculated in the plug-in according to the controller algorithm described above.

A process engineer or a control engineer, who generally determines the actual form and extent of the control action, can set the parameters. They comprise the threshold values, maximum step sizes, controller weights, and target values. Once the new parameter settings are calculated, the script stores the setting in the data store 1660 such that the processing tool 1610 can retrieve them for the next workpiece or wafer lot to be processed. The principles taught by the present invention can be implemented into other types of manufacturing frameworks.

Returning again to FIG. 18, the calculation of new settings comprises, as set forth in box 1830, modeling the workpiece photolithography overlay error measurements as a function of the chemical-mechanical planarization (CMP) tool identification and parameters. This modeling may be performed by the Matlab® plug-in. In this particular embodiment, only known, potential characteristic parameters are modeled and the models are stored in a database 1635 accessed by a machine interface 1730. The database 1635 may reside on the workstation 1630, as shown, or some other part of the APC framework. For instance, the models might be stored in the data store 1660 managed by the APC system manager 1740 in alternative embodiments. The model will generally be a mathematical model, i.e., an equation describing how the change(s) in chemical-mechanical planarization (CMP) control(s) affects the chemical-mechanical planarization (CMP) performance and the accuracy of the photolithography overlay metrology, and the like.

The particular model used will be implementation specific, depending upon the particular processing tool 1610 and the particular characteristic parameters being modeled. Whether the relationship in the model is linear or non-linear will be dependent on the particular characteristic parameters involved.

The new settings are then transmitted to and applied by the processing tool controller 1615. Thus, returning now to FIG. 18, once the characteristic parameters are modeled, the model is applied to modify at least one chemical-mechanical planarization (CMP) control input parameter, as set forth in box 1840. In this particular embodiment, the machine interface 1730 retrieves the model from the database 1635, plugs in the respective value(s), and determines the necessary change(s) in the chemical-mechanical planarization (CMP) control input parameter(s). The change is then communicated by the machine interface 1730 to the equipment interface 1710 over the line 1620. The equipment interface 1710 then implements the change.

The present embodiment furthermore provides that the models be updated. This comprises, as set forth in boxes 1850–1860 of FIG. 18, monitoring at least one effect of modifying the chemical-mechanical planarization (CMP) control input parameters (box 1850) and updating the applied model (box 1860) based on the effect(s) monitored. For instance, various aspects of the operation of the processing tool 1610 will change as the processing tool 1610 ages. By monitoring the effect of the chemical-mechanical planarization (CMP) change(s) implemented as a result of the characteristic parameter (e.g., workpiece 1605 photolithography overlay error or POE) measurement, the necessary value could be updated to yield superior performance.

As noted above, this particular embodiment implements an APC system. Thus, changes are implemented "between" lots. The actions set forth in the boxes 1820–1860 are implemented after the current lot is processed and before the second lot is processed, as set forth in box 1870 of FIG. 18. However, the invention is not so limited. Furthermore, as noted above, a lot may constitute any practicable number of workpieces or wafers from one to several thousand (or practically any finite number). What constitutes a "lot" is implementation specific, and so the point of the fabrication process in which the updates occur will vary from implementation to implementation.

Any of the above-disclosed embodiments of a method of manufacturing according to the present invention enables the use of photolithographic overlay parameter measurements and information relating to use of a chemical-mechanical planarization (CMP) tool to make supervisory processing adjustments, either manually and/or automatically, to improve and/or better control the accuracy in photolithographic overlay metrology and/or fault detection in chemical-mechanical planarization (CMP). Additionally, any of the above-disclosed embodiments of a method of manufacturing according to the present invention enables semiconductor device fabrication with increased device accuracy and precision, increased efficiency and increased device yield, enabling a streamlined and simplified process flow, thereby decreasing the complexity and lowering the costs of the manufacturing process and increasing throughput.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
    processing a workpiece, having a photolithography overlay target structure disposed thereon, using a chemical-mechanical planarization (CMP) tool;
    measuring a photolithography overlay parameter using the photolithography overlay target structure;
    forming an output signal corresponding to the photolithography overlay parameter measured and to the chemical-mechanical planarization (CMP) tool used; and
    using the output signal to improve at least one of accuracy in photolithography overlay metrology and fault detection in chemical-mechanical planarization (CMP).

2. The method of claim 1, wherein forming the output signal comprises tracking use of the chemical-mechanical planarization (CMP) tool to identify an impact of the chemical-mechanical planarization (CMP) tool on the accuracy in die photolithography overlay metrology.

3. The method of claim 2, wherein using the output signal comprises using the impact of the chemical-mechanical planarization (CMP) tool on the accuracy in the photolithography overlay metrology as an input to a characteristic disturbance model.

4. The method of claim 3, wherein using the output signal comprises using the characteristic disturbance model to improve the accuracy in the photolithography overlay metrology.

5. The method of claim 1, wherein forming the output signal comprises tracking use of the chemical-mechanical planarization (CMP) tool to monitor performance of the chemical-mechanical planarization (CMP) tool.

6. The method of claim 5, wherein using the output signal comprises using the performance of the chemical-mechanical planarization (CMP) tool to improve the fault detection in the chemical-mechanical planarization (CMP).

7. The method of claim 5, wherein forming the output signal comprises tracking us of the chemical-mechanical planarization (CMP) tool to identify an impact of the chemical-mechanical planarization (CMP) tool on the accuracy in the photolithography overlay metrology.

8. The method of claim 7, wherein using the output signal comprises using the impact of the chemical-mechanical planarization (CMP) tool on the accuracy in the photolithography overlay metrology as an input to a characteristic disturbance model.

9. The method of claim 8, wherein using the output signal comprises using the characteristic disturbance model to improve the accuracy in the photolithography overlay metrology.

10. The method of claim 9, wherein using the output signal comprises using the performance of the chemical-mechanical planarization (CMP) tool to improve the fault detection in the chemical-mechanical planarization (CMP).

11. The method of claim 1, wherein measuring the photolithography overlay parameter Using the photolithography overlay target structure comprises measuring a photolithography overlay error of the photolithography overlay target structure.

12. The method of claim 1, wherein using the output signal to improve the accuracy in the photolithography overlay metrology comprises using the output signal to bring the measured photolithography overlay parameter within a range of specification values.

13. A computer-readable, program storage device encoded with instructions that, when executed by a computer, enable a processor tool to perform a method comprising:
    processing a workpiece, having a photolithography overlay target structure disposed thereon, using a chemical-mechanical planarization (CMP) tool;

measuring a photolithography overlay parameter using the photolithography overlay target structure;

forming an output signal corresponding to the photolithography overlay parameter measured and to the chemical-mechanical planarization (CMP) tool used; and using the output signal to improve at least one of accuracy in photolithography overlay metrology and fault detection in chemical-mechanical planarization (CMP).

14. The device of claim 13, wherein forming the output signal comprises tracking use of the chemical-mechanical planarization (CMP) tool to identify an impact of the chemical-mechanical planarization (CMP) tool on the accuracy in the photolithography overlay metrology.

15. The device of claim 14, wherein using the output signal comprises using the impact of the chemical-mechanical planarization (CMP) tool on the accuracy in the photolithography overlay metrology as an input to a characteristic disturbance model.

16. The device of claim 15, wherein using the output signal comprises using the characteristic disturbance model to improve the accuracy in the photolithography overlay metrology.

17. The device of claim 13, wherein forming the output signal comprises tracking use of the chemical-mechanical planarization (CMP) tool to monitor performance of the chemical-mechanical planarization (CMP) tool.

18. The device of claim 17, wherein using the output signal comprises using the performance of the chemical-mechanical planarization (CMP) tool to improve the fault detection in the chemical-mechanical planarization (CMP).

19. The device of claim 17, wherein forming the output signal comprises tracking use of the chemical-mechanical planarization (CMP) tool to identify an impact of the chemical-mechanical planarization (CMP) tool on the accuracy in the photolithography overlay metrology.

20. The device of claim 19, wherein using the output signal comprises using the impact of the chemical-mechanical planarization (CMP) tool on the accuracy in the photolithography overlay metrology as an input to a characteristic disturbance model.

21. The device of claim 20, wherein using the output signal comprises using the characteristic disturbance model to improve the accuracy in the photolithography overlay metrology.

22. The device of claim 21, wherein using the output signal comprises using the performance of the chemical-mechanical planarization (CMP) tool to improve the fault detection in the chemical-mechanical planarization (CMP).

23. The device of claim 13, wherein measuring the photolithography overlay parameter using the photolithography overlay target structure comprises measuring a photolithography overlay error of the photolithography overlay target structure.

24. The device of claim 13, wherein using the output signal to improve the accuracy in the photolithography overlay metrology comprises using the output signal to bring the measured photolithography overlay parameter within a range of specification values.

25. A computer programmed to enable a processor tool to perform a method comprising:

processing a workpiece, having a photolithography overlay target structure disposed thereon, using a chemical-mechanical planarization (CMP) tool;

measuring a photolithography overlay parameter using the photolithography overlay target structure;

forming an output signal corresponding to the photolithography overlay parameter measured and to the chemical-mechanical planarization (CMP) tool used; and using the output signal to improve at least one of accuracy in photolithography overlay metrology and fault detection in chemical-mechanical planarization (CMP).

26. The computer of claim 25, wherein forming the output signal comprises tracking use of the chemical-mechanical planarization (CMP) tool to identify an impact of the chemical-mechanical planarization (CMP) tool on the accuracy in the photolithography overlay metrology.

27. The computer of claim 26, wherein using the output signal comprises using the impact of the chemical-mechanical planarization (CMP) tool on the accuracy in the photolithography overlay metrology as an input to a characteristic disturbance model.

28. The computer of claim 27, wherein using the output sign comprises using the characteristic disturbance model to improve the accuracy in the photolithography overlay metrology.

29. The computer of claim 25, wherein forming the output signal comprises tracking use of the chemical-mechanical planarization (CMP) tool to monitor performance of the chemical-mechanical planarization (CMP) tool.

30. The computer of claim 29, wherein using the output signal comprises using the performance of the chemical-mechanical planarization (CMP) tool to improve the fault detection in the chemical-mechanical planarization (CMP).

31. The computer of claim 29, wherein forming the output signal comprises tracking use of the chemical-mechanical planarization (CMP) tool to identify an impact of the chemical-mechanical planarization (CMP) tool on the accuracy in the photolithography overlay metrology.

32. The computer of claim 31, wherein using the output signal comprises using the impact of the chemical-mechanical planarization (CMP) tool on the accuracy in the photolithography overlay metrology as an input to a characteristic disturbance model.

33. The computer of claim 32, wherein using the output signal comprises using the characteristic disturbance model to improve the accuracy in the photolithography overlay metrology.

34. The computer of claim 33, wherein using the output signal comprises using the performance of the chemical-mechanical planarization (CMP) tool to improve the fault detection in the chemical-mechanical planarization (CMP).

35. The computer of claim 25, wherein measuring the photolithography overlay parameter using the photolithography overlay target structure comprises measuring a photolithography overlay error of the photolithography overlay target structure.

36. The computer of claim 25, wherein using the output signal to improve the accuracy in the photolithography overlay metrology comprises using the output signal to bring the measured photolithography overlay parameter within a range of specification values.

* * * * *